UNITED STATES PATENT OFFICE.

ADOLF DIEFENBACH, OF BENSHEIM, GERMANY.

PROCESS OF PREPARING A REFINED EXTRACT FROM CASCARA SAGRADA.

1,043,209. Specification of Letters Patent. Patented Nov. 5, 1912.

No Drawing. Application filed January 31, 1912. Serial No. 674,620.

*To all whom it may concern:*

Be it known that I, ADOLF DIEFENBACH, pharmaceutical chemist, a subject of the German Emperor, and resident of Bensheim a. d. B., Hesse, Germany, have invented new and useful Improvements in Processes of Preparing Refined Extracts from Cascara Sagrada, of which the following is a specification.

It is known that cascara sagrada contains a number of more or less effective components and efforts have been made for many years to isolate said components in order to obtain extracts which preferably contain the effective substances.

It has been discovered that a great portion of the substances extracted from the bark, which are soluble in water, are insoluble in a concentrated solution of a salt, and furthermore, that the substances which are soluble in the salt solution are more effective and also more pleasant in action than the extracts prepared according to the prescriptions set forth in the different pharmacopœias. Although extracts thus obtained are very mild in their action they nevertheless constitute excellent purgatives which may be taken in relatively smaller doses, but even when taken in the usual doses cause no unpleasant after-effects. For these reasons such extracts are eminently suitable for medical purposes as the method of making them is a relatively simple and cheap one.

The process of this invention is as follows: To an aqueous solution of an extract from cascara sagrada, which has been first prepared in any suitable manner, is added a suitable salt, soluble in water, in such quantity, that a saturated solution of the salt is obtained. Thereby an abundant precipitate is formed, from which the supernatant liquor can be easily separated by filtration. From this liquor the salt is then separated by a suitable treatment, whereupon the liquor which now contains no more salt, is concentrated by evaporation. Among other salts, which can be used for the precipitation, the following are to be named as suitable ones, viz: common salt (sodium chlorid), ammonium chlorid, sodium sulfate, ammonium sulfate, as well as other salts, which are easily soluble in water. The salt is removed from the aqueous solution by the addition of alcohol. Sodium sulfate has been found to be specially suitable as it is easily soluble, gives an effective precipitation, and can be removed from the aqueous solution by the addition of alcohol so as to leave therein only very small quantities.

Extracts obtained according to the above process may be distinguished from the usual extracts of commerce by the following properties: 1. When dissolved in water the solution is clear. 2. The aqueous solution remains also clear after the addition of diluted sulfuric acid or hydro-chloric acid, whereas extracts of commerce become precipitated at once when so treated. 3. When a tannin solution is carefully added to said aqueous solution, either no precipitate, or at all events, only a very small and flaky one is formed, whereas in the case of a solution of the usual extract a thick precipitate is obtained.

Example: 1 kilo of cascara sagrada is extracted in the usual manner by water; the aqueous extract is then concentrated by evaporation to about 1 to 2 kilos, whereupon such a quantity of sodium sulfate is dissolved in the solution, that a saturated solution is obtained at ordinary temperature. After some hours the precipitate, which is obtained, is filtered off, washed with a little water, the solution treated once more with salt and filtered off.

The filtrates are mixed with alcohol in the proportion of $1\frac{1}{2}$ to 2 times their volumes and separated from the salt, which is precipitated by pouring off. The salt is then well washed with spirit and pressed, while the spirit, which runs off is added to the first liquor. After some time the alcoholic liquor which is nearly free from salt is concentrated by evaporation in the usual manner. The filtered off solution, which contains sodium sulfate and the extracted substances may also be further concentrated before the addition of spirit, in which case the solution is mixed with spirit, while still warm, and then treated as above set forth. Sodium sulfate is essentially more easily soluble when warm than when cold. Instead of by means of water the extract can also be obtained from the bark by means of a sodium sulfate solution or by an alternative treatment with water and sodium sulfate solution. The obtained extract-solution is then concentrated by evaporation to obtain a saturated solution (at ordinary temperature) after which it is further treated as above stated. In case alcoholic or other not pure aqueous extracts are used, those portions of the extract, that are soluble in water are treated as described hereinbefore. Instead of ethyl-alcohol other suitable alcohols may be employed for the purpose of removing the salt, or instead of alcohols other substances, which are suitable for this purpose and which can be easily separated after use. The extracts obtained as above set forth are very hygroscopic, are of hop-like bitter taste, and contain about 1% of sodium sulfate and yield about 5 to 6% of ash.

Now what I claim and desire to secure by Letters Patent is the following:

1. The process of preparing a refined extract from cascara sagrada which consists in first preparing an extract from cascara sagrada, then adding to an aqueous solution of the said extract a suitable soluble salt in such quantity as to produce a saturated solution, filtering off the liquid from the obtained precipitate, then precipitating the salt from the purified solution, and filtering off and concentrating the liquor by evaporation.

2. The process of preparing a refined extract from cascara sagrada which consists in first preparing an extract from cascara sagrada, then adding to an aqueous solution of the said extract a salt, easily soluble in water, in such quantity as to produce a saturated solution, filtering off the liquid from the obtained precipitate, then precipitating the salt from the purified solution, and filtering off and concentrating the liquor by evaporation.

3. The process of preparing a refined extract from cascara sagrada which consists in first preparing an extract from cascara sagrada, then adding to an aqueous solution of the said extract sodium sulfate in such quantity as to produce a saturated solution, filtering off the liquid from the obtained precipitate, then precipitating the salt from the purified solution, and filtering off and concentrating the liquor by evaporation.

4. The process of preparing a refined extract from cascara sagrada which consists in first preparing an extract from cascara sagrada, then adding to an aqueous solution of the said extract a suitable salt in such quantity as to produce a saturated solution, filtering off the liquid from the obtained precipitate, then precipitating the salt from the purified solution by the addition of an alcohol, and filtering off and concentrating the liquor by evaporation.

5. The process of preparing a refined extract from cascara sagrada which consists in first preparing an extract from cascara sagrada, then adding to an aqueous solution of the said extract a suitable salt in such quantity as to produce a saturated solution, filtering off the liquid from the obtained precipitate, then precipitating the salt from the purified solution by the addition of ethyl-alcohol, and filtering off and concentrating the liquor by evaporation.

In testimony that I claim the foregoing as my invention, I have signed my name in presence of two witnesses, this eighteenth day of January 1912.

ADOLF DIEFENBACH.

Witnesses:
CARL LANZ,
REINER RODMER.